Figure 1:
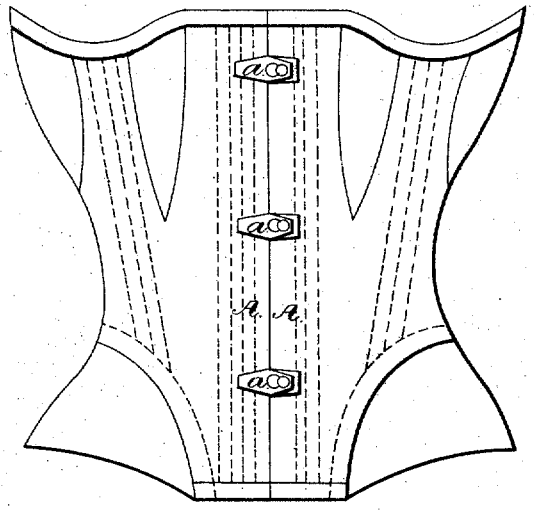
Figure 2:
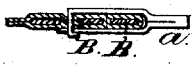

J. BOWERS:

Corsets.

No. 6,143. Reissued Nov. 24, 1874.

Attest:
F. A. Lehmann.
W. H. J. Murphy.

Inventor:
Jas Bowers.
per
A. Drake Atty.

THE GRAPHIC CO. PHOTO-LITH. 39 & 41 PARK PLACE, N.Y.

UNITED STATES PATENT OFFICE.

JAMES BOWERS, OF NEWARK, NEW JERSEY.

IMPROVEMENT IN CORSETS.

Specification forming part of Letters Patent No. 151,270, dated May 26, 1874; reissue No. 6,113, dated November 24, 1874; application filed June 27, 1874.

*To all whom it may concern:*

Be it known that I, JAMES BOWERS, of the city of Newark, in the county of Essex and State of New Jersey, have invented certain new and useful Improvements in Corsets and other Open-Front Garments; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates more particularly to certain improvements in fastenings for corsets and other open-front garments. The invention consists in the peculiar construction of the fastenings, which are made of sheet metal, and applied to the outside of the corset, as will be more fully described hereafter.

The fastenings *a* may be made of any suitable material; but I prefer having them made of sheet metal, struck up and doubled in the form shown, so as to clasp around the spring-braces B, (when the latter are used outside of the fabric A,) and fastened behind said braces, the ends of the fastenings being formed so as to be clinched or riveted, as shown, (preferably clinched, as they can be more easily removed when necessary.) The spring-braces B are inclosed in pockets formed in the edges of the garments, in the usual manner, and, as above remarked, may be inserted and removed at pleasure without interfering with the fastenings.

Heretofore it has been customary to secure the fastenings of corsets to the spring-braces; but this mode is found to be very objectionable for several reasons, viz: It weakens the braces, rendering them very liable to break and get out of shape, and difficult to be removed when necessary to wash the garment. The fastenings, also, are more liable to get out of repair.

In the present case the fastenings are constructed so as to clasp upon the outside of the fabric, and are adapted to be buttoned, which I consider preferable for obvious reasons; though, if desired, they may be formed so as to hook, and when so hooked or buttoned the edges of the garment meet, all substantially as shown.

An additional advantage in this mode of securing the fastenings is, that it will admit of two or more narrow braces being used, instead of one wide one, on each or either side, thus utilizing a great deal of stock which has heretofore been wasted, namely, the springs used in hoop-skirts; whereas the wide spring-braces now used have to be made on purpose, and are quite expensive.

Having thus described my invention, what I claim as new, and desire to secure by Letters Patent of the United States, is—

A corset or other open-front garment having spring-braces B and fastenings *a*, constructed and arranged as described and shown.

In testimony that I claim the foregoing I have hereunto set my hand this 18th day of June, 1874.

JAMES BOWERS.

Witnesses:
GEO. H. WILSON,
GEO. W. FRANCIS.